3,318,703
METHOD OF PRODUCING SUBSTITUTE FOR TRUFFLES
Johannes Jacobus Geldof, 2701 Webster St., Mount Rainier, Md. 20822
No Drawing. Filed July 8, 1964, Ser. No. 381,219
3 Claims. (Cl. 99—1)

This invention relates to a food product and more particularly one which may be used as a substitute for truffles and a method or process for manufacturing the same.

Truffles are a subterranean fungi which grow in various parts of Europe, particularly in France. A truffle as a blackish fruit of the order Tuberales, and it is considered mushroom fanciers to be especially good flavored. Since truffles grow underground, they are difficult to find and dogs and pigs are trained to find them by their sensitive sense of smell. After being taken from the ground and laid up to dry in the air and sunshine, truffles turn a dark blackish color after drying out. Since truffles do not lend themselves to artificial cultivation, they must be sought in their natural habitat. Accordingly, truffles are imported and this makes them very expensive in this country. For example, a seven ounce can of truffles may cost as much as $17 when imported in the United States.

Truffles are used to decorate meat dishes, fish and wild game, such as turkey, chicken, cold salmon and pheasant, for instance. Truffles are delicious when placed in the meat and when the meat is sliced, the color contrast between the meat and the truffles lends color appeal and further stimulates the appetite. Truffles may be used in white and brown sauces and as a garnish on staks, chops and fish as well as in gelatine and liverpaste. These are but a few of the many tasteful and decorative purposes for which truffles may be employed. The relatively high cost of truffles in the United States has limited the extent to which they have been used in this country.

Accordingly, it is a feature of this invention to provide a tasteful and decorative food product which may be used as a substitute for truffles.

It is an object of the present invention to provide a substitute for truffles which is simple to prepare.

It is another object of this invention to provide a substitute food product for truffles which is relatively inexpensive when compared to the cost of truffles.

It is a further feature of this invention to provide a substitute for truffles which is substantially similar in color, texture and taste to that of truffles.

It is another object of this invention to provide a novel and improved substitute for truffles and a method of making the same, such product being capable of being manufactured, packaged and sold commercially at a non-prohibitive cost.

It is a further feature of this invention to provide a novel and improved food product which may be used as a substitute for truffles which substitute is stable as to flavor and coloring throughout prolonged storage under normal packaging conditions.

It is a still further feature of this invention to provide a novel and improved food product as a substitute for truffles and a method for making the same which can be manufactured and packaged at a non-prohibitive cost, which will not lose its flavor or take on other flavors, which will not undergo a change in its color, and which will not become caked or lumpy under normal shelf-storage conditions.

Table 1 below illustrates the initial ingredients of a batch of artificial truffles according to this invention and the approximate percentages by weight of each.

Table 1

| | Percent |
|---|---|
| Eggyolk | 70–75 |
| Cornstarch | 10–15 |
| Water | 10–15 |
| Salt | 1.5 |
| Coloring (confectioners black) | 1.5 |

In order to illustrate the novel food product used as a substitute for truffles and the method of making the same, let it be assumed that a batch of 16.5 ounces is to be mixed. First, 12 ounces of egg yolks are placed in a mixing bowl. In a separate container 2 ounces of cornstarch, 2 ounces of water and ¼ ounce of black coloring are mixed. This mixture is poured into the egg yolks with ¼ ounce of salt and mixed. The mixing bowl is placed in warm water and the contents stirred until the mixture becomes thick. Next, the mixture is poured into containers, such as cans or jars, until they are ¾ full and then the containers are sealed. The containers are placed in hot water at approximately 180° for 20 minutes, thereby completely cooking the mixture. If the size of the batch is increased, the cooking time may be increased beyond 20 minutes to insure that the batch is thoroughly cooked. Last, the containers are removed from the hot water, allowed to cool and then placed in a refrigerator for storage.

Anyone of various coloring substances may be used, and one suitable type of coloring substance is purified carbon black (channel type) commercially available as B 3093 New Super Confectioners Black by H. Kohnstamm & Co., Inc., of New York and Chicago. This particular coloring substance includes caramel, propyleneglycol, water, and it is preserved with benzoate of soda and citric acid.

It has been found that the foreging ingredients and the amounts indicated provide a novel food product substantially identical to the color, taste, consistency and resiliency of truffles. If the amount of starch is increased while the remaining ingredients are held the same, the mixture tends to loose resiliency and become brittle. The egg yolks tend to provide suppleness or resiliency. If the amount of egg yolks is increased while keeping the remaining ingredients the same, the mixture tends to become too soft and if the amount of egg yolks is decreased, the mixture tends to become too hard and brittle. Wine can be substituted for water in the mixture. It is felt that the amount of coloring by weight may be varied, depending upon the brand used and the degree of blackishness desired.

While this invention has been described with particular reference to the above example, it should be understood that the invention is not limited thereto and that various changes may be made in the form, details, arrangements and proportions of the various parts without departing from the scope of the invention.

What is claimed is:

1. A process for making a food product used as a substitute for truffles consisting in placing egg yolks in proportion of about 70 to 75 percent by weight in a mixing bowl, mixing in a separate container cornstarch in proportion of about 10 to 15 percent by weight, water in proportion of about 10 to 15 percent by weight and a paste for coloring in proportion of about 1.5 percent by weight, pouring the mixture into the mixing bowl with the egg yolks and adding salt in proportion of about 1.5 percent by weight, placing the mixing bowl in warm water and stirring until the mixture thickens, pouring the thickened mixture into containers and filling each about ¾ full and sealing the containers, placing the containers in hot water at about 180 degrees for approximately 20 minutes, removing the containers, cooling and then refrigerating.

2. A process for making a food product for use as a substitute for truffles consisting in placing egg yolks in proportion of about 70 to 75 percent by weight in a mixing bowl, mixing in a separate container cornstarch in proportion of about 10 to 15 percent by weight, water in proportion of about 10 to 15 percent by weight and a paste in proportion of about 1.5 percent by weight, the paste comprising caramel, propylene-glycol, citric acid and benzoate of soda, pouring the mixture into the mixing bowl with the egg yolks and adding salt in proportion of about 1.5 percent by weight, placing the mixing bowl in warm water and stirring until the mixture thickens, pouring the thickened mixture into cans or jars and filling each can or jar about ¾ full and sealing the cans or jars, placing the cans or jars in hot water about 180 degrees for approximately 20 minutes, removing the cans or jars, cooling and then refrigerating.

3. A process for making a food product used as a substitute for truffles consisting in mixing egg yolks in proportion of about 70 to 75% by weight, mixing separately cornstarch in proportion of about 10 to 15% by weight, water, in proportion of about 10 to 15% by weight and a coloring substance in proportion of about 1.5% by weight, adding the mixtures together and adding salt in proportion of about 1.5% by weight, cooking and stirring the resulting mixture until it thickens and assumes an even consistency, and further cooking it at about 180° for approximately 20 minutes to produce a product substantially identical in color, taste, consistency and resiliency with natural truffles.

References Cited by the Examiner

UNITED STATES PATENTS 2,841,499   7/1958   Grossi _____ 99—148

OTHER REFERENCES

Lord, I. E.: "Everybody's Cook Book," pages 222 to 224, published 1924, by Henry Holt & Co., N.Y.

A. LOUIS MONACELL, *Primary Examiner.*

L. M. SHAPIRO, *Assistant Examiner.*